(12) United States Patent
Patterson et al.

(10) Patent No.: US 8,146,343 B2
(45) Date of Patent: Apr. 3, 2012

(54) APPROACH FOR INJECTING A REDUCTANT

(75) Inventors: Joseph Patterson, Dearborn, MI (US); Paul M. Laing, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 914 days.

(21) Appl. No.: 11/835,943

(22) Filed: Aug. 8, 2007

(65) Prior Publication Data

US 2009/0038298 A1    Feb. 12, 2009

(51) Int. Cl.
F01N 3/00    (2006.01)
F01N 3/10    (2006.01)

(52) U.S. Cl. ........... 60/275; 60/274; 60/286; 60/295; 60/301; 60/303

(58) Field of Classification Search .......... 60/273, 60/275, 286, 295, 301, 303, 274; 423/238
See application file for complete search history.

(56) References Cited

U.S. PATENT DOCUMENTS

| | | | |
|---|---|---|---|
| 3,954,119 A * | 5/1976 | Kunioka et al. | 137/92 |
| 7,426,825 B2 * | 9/2008 | Viola et al. | 60/286 |
| 2003/0033799 A1 * | 2/2003 | Scheying | 60/286 |
| 2004/0025498 A1 * | 2/2004 | Lambert et al. | 60/286 |
| 2004/0124259 A1 | 7/2004 | Guezennec et al. | |
| 2006/0115402 A1 | 6/2006 | Sun et al. | |
| 2006/0147361 A1 | 7/2006 | Spokoyny | |
| 2006/0254258 A1 * | 11/2006 | Blakeman et al. | 60/286 |
| 2008/0041841 A1 * | 2/2008 | Tanaka et al. | 219/535 |

FOREIGN PATENT DOCUMENTS

| | | |
|---|---|---|
| JP | 3033418 | 2/1991 |
| JP | 2007182803 A | 7/2007 |
| JP | 2008/057520 | 3/2008 |
| WO | 2005028826 A1 | 3/2005 |
| WO | 2008/040631 | 4/2008 |
| WO | 2008/043937 | 4/2008 |

OTHER PUBLICATIONS

Yoshida et al., English Abstract of JP 03033418 A, Feb. 13, 1991.*
Yoshida et al., English Basic-Abstract of JP 03033418 A, Feb. 13, 1991.*
United Kingdom Intellectual Property Office, Search Report of GB0813888.5, Oct. 22, 2008, 1 page.

* cited by examiner

*Primary Examiner* — Thomas Denion
*Assistant Examiner* — Audrey K Bradley
(74) *Attorney, Agent, or Firm* — Julia Voutyras; Alleman Hall McCoy Russell & Tuttle LLP

(57) ABSTRACT

A method of operating an internal combustion engine having a reductant delivery and storage system in an emission control system is disclosed. The method comprises applying an ultrasonic field to a reductant-containing liquid in the reductant storage device to generate a mist of the reductant-containing liquid, and selectively introducing an amount of mist to an exhaust system coupled to the catalyst based on an engine operating condition.

15 Claims, 3 Drawing Sheets

FIG. 3

```
START
  ↓
DETERMINE AN AMOUNT OF UREA REQUIRED — 310
  ↓
APPLY AN ULTRASONIC FIELD TO UREA TO PRODUCE A MIST — 320
  ↓
INTRODUCE MIST TO EXHAUST — 330
  ↓
END
```

APPROACH FOR INJECTING A REDUCTANT

TECHNICAL FIELD

The present application relates to the field of automotive emission control systems and methods.

BACKGROUND AND SUMMARY

Selective catalytic reduction (SCR) systems have been used to reduce automotive emissions. Such systems typically add a gaseous or liquid reductant, such as ammonia or urea, to the exhaust gas stream from an engine to be absorbed onto a catalyst where the reductant reacts with nitrogen oxides in the exhaust gas to form water vapor and nitrogen. However, SCR systems may rely on uniform mixing of the reductant with nitrogen oxides in the exhaust stream upstream of the SCR catalyst. This may lead to various problems. For example, ineffective mixing of urea delivered from an on-board storage device may reduce the conversion efficiency of nitrogen oxides at the SCR catalyst.

One way to facilitate mixing of urea injects a urea solution directly into the engine exhaust stream. For example, an injector may apply pressure to force the urea solution through an orifice to facilitate a dispersion of urea in the exhaust stream. However, concerns of equipment weight and robustness against orifice plugging may prove such systems undesirable.

The inventors herein have realized that these concerns and others may be addressed by applying an ultrasonic field to a reductant-containing liquid in the reductant storage device to generate a mist of the reductant-containing liquid, and selectively introducing an amount of mist to an exhaust system coupled to the catalyst based on an engine operating condition. Such methods of generating and supplying a mist from the reductant may facilitate the delivery of a uniform mixture of reductant and nitrogen oxide and nitrogen dioxide (NOx) to the emission control device with reduced weight and robustness concerns.

BRIEF DESCRIPTION OF THE DRAWINGS

FIG. 3 is a flowchart of an exemplary method for operating an emission control system.

DETAILED DESCRIPTION OF THE DEPICTED EMBODIMENTS

Figure 1:
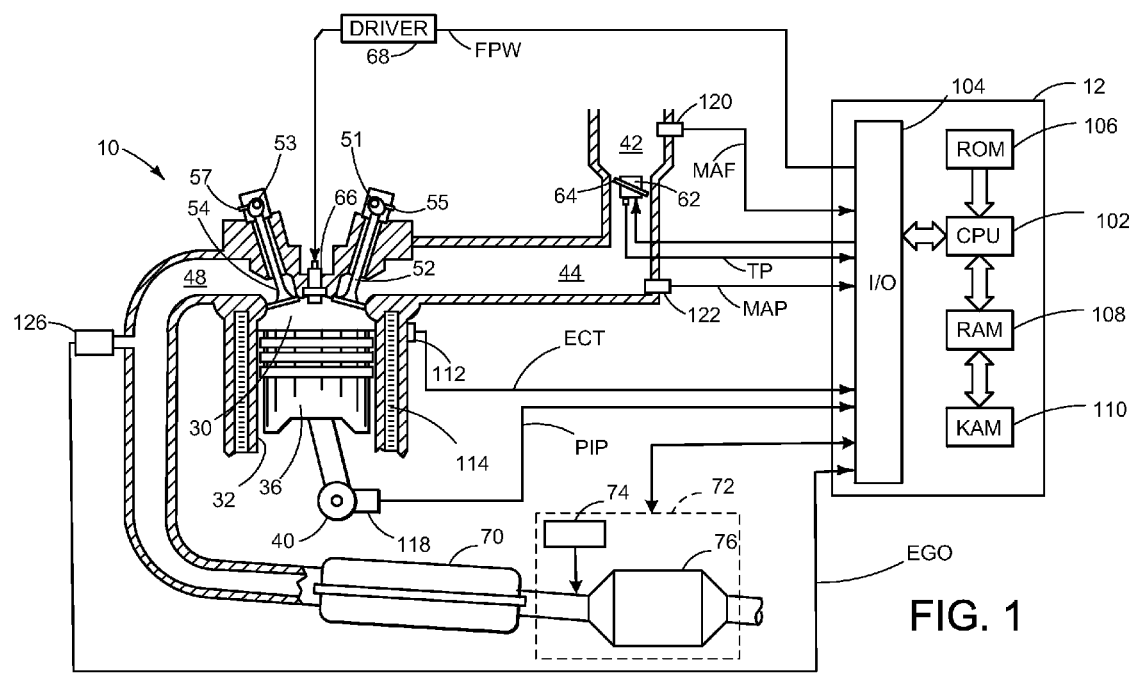
FIG. 1 shows an exemplary embodiment of an internal combustion engine and control system.

Referring now to FIG. 1, direct injection internal combustion engine 10, comprising a plurality of combustion chambers and controlled by electronic engine controller 12, is shown. Combustion chamber 30 of engine 10 includes combustion chamber walls 32 with piston 36 positioned therein and connected to crankshaft 40. In one example, piston 36 includes a recess or bowl (not shown) to form selected levels of stratification or homogenization of charges of air and fuel. Alternatively, a flat piston may also be used.

Combustion chamber 30 is shown communicating with intake manifold 44 and exhaust manifold 48 via intake valve 52, and exhaust valve 54. Fuel injector 66 is shown directly coupled to combustion chamber 30 for delivering liquid fuel directly therein in proportion to the pulse width of signal fpw received from controller 12 via conventional electronic driver 68. Fuel is delivered to fuel system (not shown) including a fuel tank, fuel pumps, and a fuel rail. In some embodiments, engine 10 may include a plurality of combustion chambers each having a plurality of intake and/or exhaust valves.

Intake valve 52 may be controlled by controller 12 via electric valve actuator (EVA) 51. Similarly, exhaust valve 54 may be controlled by controller 12 via EVA 53. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, combustion chamber 30 may alternatively include an intake valve controlled via electric valve actuation and an exhaust valve controlled via cam actuation including CPS and/or VCT.

Intake manifold 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake manifold 42 may include a mass air flow sensor 120 and a manifold air pressure sensor 122 for providing respective signals MAF and MAP to controller 12.

Controller 12 activates fuel injector 66 so that a desired air-fuel ratio mixture is formed. Controller 12 controls the amount of fuel delivered by fuel injector 66 so that the air-fuel ratio mixture in chamber 30 can be selected to be substantially at (or near) stoichiometry, a value rich of stoichiometry, or a value lean of stoichiometry. Further, controller 12 is configured to activate fuel injector 66 so that multiple fuel injections may be performed during a cycle.

Exhaust manifold gas sensor 126 is shown coupled to exhaust passage 48 upstream of catalytic converter 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, hydrocarbon (HC), or carbon monoxide (CO) sensor.

Catalytic converter 70 is shown in communication with exhaust manifold 48. In some embodiments, catalytic converter 70 may be a diesel oxidation catalyst. An emission control system 72 is shown downstream catalytic converter 70. Emission control system 72 may include reductant storage device 74 and emission control device 76. Emission control device 76 is shown in communication with catalytic converter 70. Reductant storage device 74 may supply a reductant to an exhaust stream entering emission control device 76. Emission control system 72 is described in more detail in FIG. 2.

Controller 12 is shown in FIG. 1 as a conventional microcomputer including: microprocessor unit 102, input/output ports 104, an electronic storage medium of executing programs and calibration values, shown as read-only memory chip 106 in this particular example, random access memory 108, keep alive memory 110, and a conventional data bus.

Controller 12 is shown receiving various signals from sensors coupled to engine 10, in addition to those signals previously discussed, including: engine coolant temperature (ECT) from temperature sensor 112 coupled to cooling sleeve 114; a profile ignition pickup signal (PIP) from Hall effect sensor 118 coupled to crankshaft 40 giving an indication of engine speed (RPM); throttle position TP from throttle position sensor 120; and absolute Manifold Pressure Signal MAP from sensor 122. Engine speed signal RPM is generated by controller 12 from signal PIP in a conventional manner and manifold pressure signal MAP provides an indication of engine load. Controller 12 is configured to control emission control system 72. Further, emission control system 72 may send feedback to controller 12. This feature is described in more detail below.

Combustion in engine 10 can be of various types, depending on operating conditions. While FIG. 1 depicts a compression ignition engine, it will be appreciated that the embodiments described below may be used in any suitable engine, including but not limited to, diesel and gasoline compression ignition engines, spark ignition engines, direct or port injection engines, etc. Further, various fuels and/or fuel mixtures such as gasoline, diesel, H2, ethanol, methane, and/or combinations thereof may be used.

Figure 2:
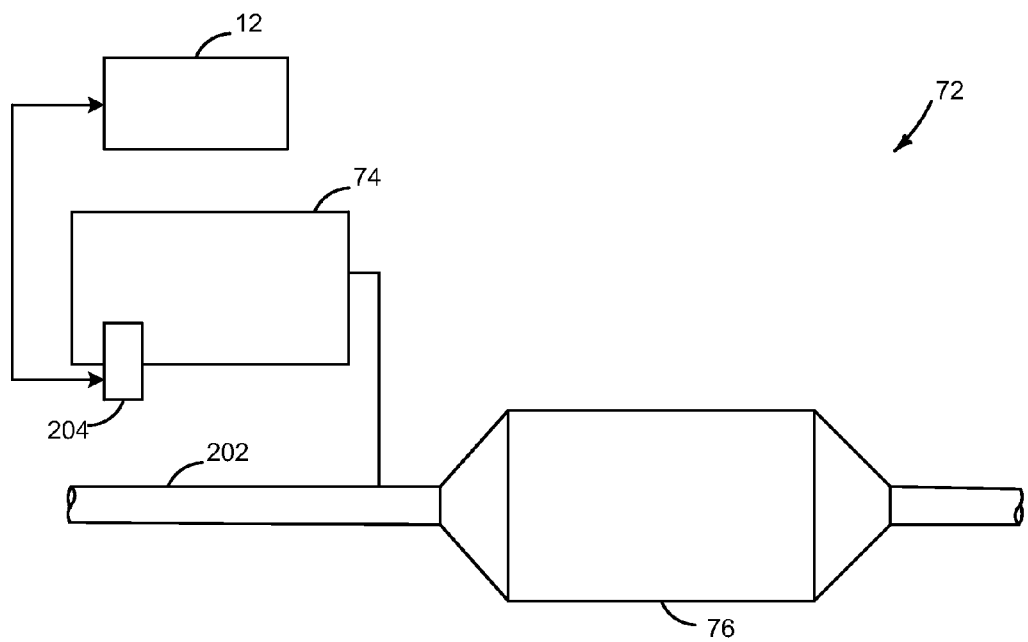
FIG. 2 shows an exemplary embodiment of an emission control system.

FIG. 2 shows an example of emissions control system 72 of engine 10 in more detail. Generally, the components described herein may operate to supply a reductant to exhaust system 202. In particular, emission control system 72 may supply a mist from a reductant or reductant-containing liquid stored in a reductant storage device 74. Further, emission control system 72 may include controller 12 configured to control the selective generation and supply of a mist of the stored reductant to the exhaust system.

Reductant storage device 74 may be an on-board storage device for storing a reductant used in emission control device 76. In particular, the reductant storage device may store an aqueous urea solution supplied by a vehicle operator, for example, although various other reductants may be used. In some embodiments, reductant storage device 202 may include an ultrasonic device 204 configured to generate a mist within reductant storage device 74. For example, ultrasonic device 204 may selectively generate a mist of a urea solution stored in reductant storage device by applying an ultrasonic field to the urea solution. This feature may be described in more detail below.

Under some conditions, reductant from reductant storage device 74 may be supplied to exhaust system 202. Accordingly, when such conditions are detected, the controller may prompt emission control system 72 to release an amount of reductant from the reductant storage device so as to substantially reduce NOx exiting emission control device 76. As such, reductant from the reductant storage device may be absorbed in emission control device 76 to reduce NOx in the exhaust stream.

Urea solution stored in reductant storage device 74 may decompose to ammonia, whereby ammonia may convert NOx at emission control device 76. Further, urea may be decomposed to ammonia at various locations between reductant storage device 74 and emission control device 76. In one embodiment, urea solution may be decomposed to ammonia prior to entering exhaust system 202. For example, heat may be applied to the urea solution stored in reductant storage device 74 so as to produce ammonia. In another example, the stored urea solution may be agitated so as to release ammonia prior to entering exhaust system 202. As such, ammonia may be introduced to exhaust system 202 to reduce NOx.

However, under some conditions, it may be desirable to introduce urea solution to exhaust system 202 instead of ammonia. In particular, urea solution may be delivered to exhaust system 202, for example, to reduce power consumed from generating ammonia. Alternately, for example, heat from the exhaust stream of the engine may facilitate decomposition of urea introduced to exhaust system 202.

First, urea added to exhaust system 202 may decompose into ammonia ($NH_3$). As an example, the decomposition might occur via the following reaction pathway, with isocyanic acid as an intermediate:

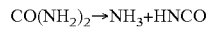

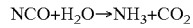

Ammonia may, in turn, react with NOx in emission control device 76 (e.g. SCR catalyst, etc.) according to various different reaction pathways, including but not limited to one or more of the following:

$$4NO+4NH_3+O_2 \rightarrow 4N_2+6H_2O$$

$$2NO_2+4NH_3+O_2 \rightarrow 3N_2+6H_2O$$

$$6NO_2+8NH_3 \rightarrow 7N_2+12H_2O$$

$$NO+NO_2+2NH_3 \rightarrow 2N_2+3H_2O$$

In the above reactions, NOx and NH3 interact to form $N_2$ and $H_2O$ as products; however, reaction pathways in which NOx and $NH_3$ interact to form species other than $N_2$ and $H_2O$ are also possible. By no means should the sets of reactions in the above examples be construed as a complete reaction manifold.

NOx conversion efficiency may be increased in emission control device when a homogenous mixture of urea and NOx may be generated. By doing this, ammonia may be sufficiently accessible to NOx as urea decomposes along exhaust system 202. In one embodiment, emission control system 72 may include an injector to introduce droplets of urea solution to the exhaust system. For example, an injector may be used to apply pressure to force urea solution through a machined spray nozzle to the exhaust system. By doing this, urea may be dispersed in an exhaust stream such that uniform mixture of urea solution with NOx from the engine exhaust may be generated.

Under some conditions, it may be desirable to supply a urea mist to exhaust system 202. In particular, droplets substantially smaller and/or slower than droplets formed via an injector may be introduced to exhaust system 202. It may be appreciated that a mist may include droplets in a lower volume range than droplets formed by an injection nozzle, for example. Specifically, a droplet size comparison of ultrasonic droplets in a urea mist to drops formed by a spray nozzle may be a ratio of approximately one to fifteen. For example, droplets in a urea mist may be approximately 0.52 cubic microns while spray nozzles may produce droplets of approximately 1767 cubic microns.

A mist may be generated from the urea solution by applying an ultrasonic field to the urea solution. In one example, a urea mist may be directly formed in exhaust system 202 via an ultrasonic nozzle. However, it may be advantageous to generate a mist at reductant storage device 74 prior to introducing the reductant to exhaust system 202.

Reductant storage device 202 may include ultrasonic device 204. In particular, ultrasonic device 204 may be configured to generate a mist within reductant storage device 74. In some embodiments, ultrasonic device 204 may include one or more transducers configured to selectively apply an ultrasonic field to the urea solution. For example, ultrasonic device 204 may be a harshly resonant diaphragm and/or may be fabricated so as to be resistant to corrosive interaction with the urea solution. Ultrasonic device 204 may be coupled to reductant storage device 74 such that an ultrasonic field may be applied to the urea solution. Alternately or in addition, ultrasonic device 204 may be at least partially submerged in the urea solution. In this way, a mist may be generated from the urea solution at reductant storage device 74.

It may be understood that an ultrasonic field applied to the stored urea solution may be varied to adjust an amount of mist generated. For example, an amplitude, period, frequency, length, various other parameters associated with the ultrasonic field, or some combination thereof may be varied to adjust an amount of mist generated. Further, under some conditions, it may be desirable to apply an ultrasonic field such that the urea solution may be essentially converted to a mist formed from the urea solution. For example, ultrasonic device 204 may be configured to operate such that ammonia generation from the urea solution in response to the ultrasonic field may be reduced or substantially avoided. Further, ultrasonic device 204 may be operated in the absence of direct heating, although heat transfer from the engine may still occur. As such, the decomposition of urea in the urea solution may be reduced prior to introducing the mist to exhaust system 202.

In some embodiments, the mist of the urea solution may be at least temporarily stored prior to being introduced to exhaust system 202. In one example, mist generated from the urea solution may be at least temporarily stored in reductant storage device 74. In another example, an intermediate reductant storage device (not shown) may be disposed between reductant storage device 74 and exhaust system 202 such that the mist may be at least temporarily stored prior to being introduced to exhaust system 202. In this way, the mist may be at least temporarily stored and subsequently supplied to exhaust system 202 as prompted by controller 12.

In other embodiments, the mist of the urea solution may be directly introduced to exhaust system 202. In particular, an ultrasonic field may be applied so as to generate an amount of urea mist where the amount of urea mist may correspond to an amount of urea to substantially consume the urea and reduce NOx in the exhaust stream derived from the above NOx reduction reaction stoichiometries or a look-up table stored in the controller. Further, the amount of urea to substantially reduce NOx may be based on information from a sensor. For example, the output signal from a sensor, such as exhaust gas manifold sensor 126 shown in FIG. 1, may indicate an amount of NOx in the exhaust. As such, an amount of mist of the urea solution expected to substantially consume the urea and reduce NOx in the exhaust stream may be introduced to the exhaust system following the applied ultrasonic field. In this way, the urea mist may be generated and supplied to the exhaust stream on-demand.

Under some conditions, some ammonia may be generated in reductant storage device 74 although the ultrasonic field applied to the urea solution may not correspond to an ultrasonic field to generate ammonia. For example, heat transfer from engine system 10 may facilitate thermal decomposition of ammonia. Therefore, in some embodiments, the ultrasonic field may be varied to reduce an amount of urea mist generated based on an ammonia concentration in reductant storage device 74, for example. In another embodiment, the amount of mist introduced to exhaust system 202 may be further adjusted based on a detected ammonia concentration detected via an ammonia sensor within reductant storage device 74. In one example, the amount of mist introduced to exhaust system 202 may be adjusted when a concentration of ammonia exceeds a predetermined threshold. As such, controller 12 may adjust the ultrasonic field and/or the amount of mist introduced to exhaust system 202 based on an ammonia sensor to account for ammonia unintentionally generated as a result of heat transferred from the system, for example.

Further, under some conditions, the composition of urea and water in a plurality of phases may vary. For example, an amount of urea may solidify while a corresponding amount of water may not solidify. As such, the composition of the liquid urea solution may be altered such that a mist generated from the liquid urea solution may be adjusted to facilitate NOx reduction. Accordingly, it may be desirable to include a concentration sensor whereby the amount of mist generated may be adjusted based on a concentration of urea. Alternately or in addition, reductant storage device 74 may include a temperature sensor such that feedback from the temperature sensor may be used to determine a concentration of urea in the urea solution.

In some embodiments, a eutectic solution including urea and water may be supplied to reductant storage device 74 such that the composition of urea and water in a plurality of phases may not vary substantially. It may be appreciated that a eutectic mixture may be a mixture of two or more phases at a composition that has the lowest melting point, and where the phases simultaneously crystallize from liquid solution at this temperature. By using a eutectic aqueous urea solution, the composition of two or more phases of the solution may include substantially the same make-up of water and urea. For example, frozen water and crystallized urea from a eutectic aqueous urea solution may be present in a substantially equivalent ratio in the liquid aqueous urea solution. As such, it may be desirable to generate a mist from a eutectic aqueous urea solution in reductant storage device 74. In doing this, emission control system 72 may facilitate accurate metering of the reductant to emission control device 76.

FIG. 3 illustrates a flow chart of an exemplary method for operating emission control system. Generally, method 300 may generate and supply an amount of mist from a urea solution to an exhaust stream upstream of an emission control device to substantially reduce NOx from the engine. In particular, method 300 includes determining an amount of urea to reduce NOx in the exhaust stream, applying an ultrasonic field corresponding to the determined amount of urea to generate a mist from a urea solution, and introducing the mist to an exhaust system so as to substantially mix the mist with NOx prior to conversion at the emission control device.

At 310, method 300 may determine an amount of urea required to reduce NOx in the exhaust stream from the engine. In particular, an amount of urea required to reduce NOx in the exhaust may be determined based on one or more sensors. As described above, an amount of urea required to reduce NOx may be generally derived from the above NOx reduction reaction stoichiometries based on a concentration of NOx in the exhaust as indicated by the exhaust gas manifold sensor.

Next, at 320, an ultrasonic field may be applied to the urea solution to generate a mist from the urea solution. In some embodiments, the applied ultrasonic field may correspond to the amount of urea required to reduce NOx in the exhaust as determined at step 310. In particular, various parameters of an ultrasonic field corresponding to the required amount of urea may be derived from a look-up table stored in the controller. Further, an ultrasonic field may be applied such that ammonia generation may be reduced or substantially avoided. As such, a mist of the urea solution may be generated and stored in the reductant storage and/or an intermediate reductant storage device. Alternately, the mist may be introduced to the exhaust system directly after being generated in the reductant storage device.

Accordingly, at step 330, an amount of mist of the urea solution may be introduced to the exhaust system. In some embodiments, the ultrasonic field may generate an amount of mist corresponding to the amount of mist to be introduced to the exhaust system. As such, the ultrasonic field may be varied such that an amount of mist corresponding to the amount of urea required to substantially reduce NOx, as determined in step 310, may be generated and substantially supplied to the exhaust system. In one example, an amount of mist of a eutectic urea solution corresponding to the amount of urea required to reduce NOx may be generated based on a look-up table stored in the controller, whereby the generated mist may be substantially supplied to the exhaust system. In another embodiment, the emission control system may include a flow adjusting device configured to adjust an amount of the mist introduced to the exhaust system. For example, the flow adjusting device may be configured to deliver at least a portion of the mist stored in the reductant storage device and/or an intermediate reductant storage device corresponding to the amount of urea determined at step 310.

In some embodiments, the amount of mist introduced to the exhaust system may be adjusted based on various operating conditions. In one embodiment, the amount of mist introduced to the exhaust system may be adjusted based on a concentration of urea in the urea solution. For example, the amount of mist introduced to the exhaust system may be increased based on a detected drop of urea concentration in the urea solution. As such, a urea concentration sensor, a temperature sensor, a pressure sensor, various other sensors associated with detecting a concentration of urea, or some combination thereof may be included in the reductant storage device. In another embodiment, the amount of mist to be introduced may be adjusted based on a concentration of ammonia detected in the reductant storage device. For example, when an amount of ammonia may be generated as a result of heat transfer from the system, the amount of mist introduced to the exhaust system may be reduced so as to reduce an excess of reductant at the emission control device. In this way, an amount of urea required to substantially reduce NOx in the exhaust may be determined based on feedback from the exhaust gas manifold sensor, the ammonia sensor, the concentration sensor, a NOx concentration sensor, various other sensors, or some combination thereof.

Further, while the mist may be generated directly in the exhaust system, such as by an ultrasonic nozzle, the mist may be passively introduced to the exhaust system. In one example, a low pressure stream of air may be directed to the mist and into the exhaust system so as to passively mix the urea mist with NOx in the exhaust. In another example, at least a portion of the exhaust stream may be directed to the mist and reintroduced with the mist to the exhaust stream.

It may be appreciated that the order of processing to be detailed is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into a computer readable storage medium for the sensor, for example, in the engine control system.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a catalyst coupled to a vehicle's engine, comprising:

applying an ultrasonic field to a reductant-containing liquid in a reductant storage device to generate a mist of the reductant-containing liquid;

varying the ultrasonic field based on an ammonia concentration in the reductant storage device; and selectively introducing an amount of the mist to an exhaust system coupled to the catalyst based on an engine operating condition, where the reductant-containing liquid is a urea solution, and where the ultrasonic field is applied in the absence of direct heating.

2. The method of claim 1, where the urea solution is a eutectic solution.

3. The method of claim 1, wherein the selectively introduced mist is introduced with a low pressure gas stream.

4. The method of claim 1, wherein the field is reduced based on an increased ammonia concentration beyond a threshold.

5. The method of claim 1, wherein the engine operating condition is a NOx concentration.

6. The method of claim 1, further comprising forming the mist directly in the exhaust system.

7. The method of claim 1, further comprising adjusting the amount of the mist introduced to the exhaust system based on at least one of the ammonia concentration and a urea concentration.

8. A method for operating a catalyst coupled to a vehicle's engine, comprising:

applying an ultrasonic field to a reductant-containing liquid in a reductant storage device to generate a mist of the reductant-containing liquid;

varying the ultrasonic field based on an ammonia concentration in the reductant storage device; and selectively introducing an amount of the mist to an exhaust system coupled to the catalyst based on an engine operating condition, wherein the ultrasonic field is applied in the absence of direct heating, and wherein the reductant storage device is coupled to the exhaust system upstream of the catalyst, and wherein the reductant-containing liquid is a urea solution.

9. An apparatus, comprising:
an internal combustion engine;
an exhaust conduit configured to conduct emissions from the engine;
a catalyst disposed along the exhaust conduit;
a reductant storage device coupled to the exhaust conduit and configured to store a reductant-containing liquid;

an ultrasonic device configured to selectively generate a mist from the reductant-containing liquid; and a controller comprising memory and a processor, the memory comprising instructions executable by the processor to reduce an ultrasonic field applied by the ultrasonic device based on an increased ammonia concentration in the reductant storage device, and to generate and supply the mist to an exhaust system of the engine based on an engine operating condition.

10. The apparatus of claim 9, wherein the ultrasonic device is a harshly resonant diaphragm.

11. The apparatus of claim 9, wherein the ultrasonic device is mounted to the reductant storage device and wherein the ultrasonic device is at least partially submerged in the reductant-containing liquid.

12. A method for operating a catalyst coupled to a vehicle's engine exhaust system, comprising:
applying an ultrasonic field, in the absence of direct heating, to a urea solution in a storage device to generate a mist;

varying a frequency of the ultrasonic field based on an ammonia concentration of the solution to account for ammonia unintentionally generated from heat transfer; and selectively introducing the mist to the exhaust system based on engine operating conditions.

13. The method of claim 12 wherein the solution is a eutectic solution.

14. The method of claim 12 wherein the field is varied to reduce urea mist generation based on the ammonia concentration in the storage device detected via an ammonia sensor within the storage device.

15. The method of claim 14 wherein the solution is a eutectic solution.

* * * * *